(12) United States Patent
White et al.

(10) Patent No.: US 12,396,481 B2
(45) Date of Patent: Aug. 26, 2025

(54) TOBACCO INDUSTRY PRODUCT AND METHODS RELATING TO TOBACCO INDUSTRY PRODUCTS

(71) Applicant: British American Tobacco (Investments) Limited, London (GB)

(72) Inventors: Julian White, Cambridgeshire (GB); Martin Horrod, Cambridgeshire (GB)

(73) Assignee: British American Tobacco (Investments) Limited, London (GB)

(*) Notice: Subject to any disclaimer, the term of this patent is extended or adjusted under 35 U.S.C. 154(b) by 617 days.

(21) Appl. No.: 17/424,613

(22) PCT Filed: Jan. 21, 2020

(86) PCT No.: PCT/EP2020/051384
§ 371 (c)(1),
(2) Date: Jul. 21, 2021

(87) PCT Pub. No.: WO2020/152148
PCT Pub. Date: Jul. 30, 2020

(65) Prior Publication Data
US 2022/0087316 A1   Mar. 24, 2022

(30) Foreign Application Priority Data
Jan. 21, 2019 (GB) ..................................... 1900827

(51) Int. Cl.
*A24F 40/10* (2020.01)
*A24F 40/42* (2020.01)
(Continued)

(52) U.S. Cl.
CPC .............. *A24F 40/10* (2020.01); *A24F 40/42* (2020.01); *A24F 40/50* (2020.01); *A24F 40/53* (2020.01);
(Continued)

(58) Field of Classification Search
CPC ................................. A24F 40/53; A24F 40/90
See application file for complete search history.

(56) References Cited

U.S. PATENT DOCUMENTS

| 2014/0283856 | A1 | 9/2014 | Xiang | |
|---|---|---|---|---|
| 2017/0214261 | A1* | 7/2017 | Gratton | ................... H02J 7/342 |
| 2017/0250552 | A1* | 8/2017 | Liu | ....................... H01M 10/46 |

FOREIGN PATENT DOCUMENTS

| CN | 204888740 U | 12/2015 |
|---|---|---|
| JP | 2000246217 A | 9/2000 |

(Continued)

OTHER PUBLICATIONS

Texas Instruments, XP-002798946, Product Folder, Mar. 31, 2015, 40 pages.
International Search Report for International Application No. PCT/EP2020/051384, dated May 20, 2020, 4 pages.
(Continued)

*Primary Examiner* — Philip Y Louie
*Assistant Examiner* — Jennifer A Kessie
(74) *Attorney, Agent, or Firm* — BURR & FORMAN

(57) ABSTRACT

Disclosed is an apparatus for heating aerosolizable material to volatilize at least one component of the aerosolizable material. The apparatus comprises a first connection interface for connecting to a power source for providing power, a second connection interface for connecting to an external power source to supply power to the first connection interface, and a temperature sensitive element positioned in thermal contact with the second connection interface to be responsive to changes in the temperature of the second connection interface. The supply of electrical power to the first connection interface from the second connection interface is inhibited based on the temperature sensitive element responding to an increase in the temperature of the second connection interface. Also disclosed is a method of determining a condition of a connection interface of a tobacco (Continued)

industry product, a method of manufacturing an apparatus for heating aerosolizable material and a tobacco industry product.

10 Claims, 4 Drawing Sheets

(51) Int. Cl.
  *A24F 40/50*   (2020.01)
  *A24F 40/53*   (2020.01)
  *A24F 40/57*   (2020.01)
  *A24F 40/90*   (2020.01)
  *H01M 10/44*   (2006.01)
  *H02M 1/00*   (2006.01)

(52) U.S. Cl.
  CPC .............. *A24F 40/57* (2020.01); *A24F 40/90* (2020.01); *H01M 10/443* (2013.01); *H02M 1/0003* (2021.05)

(56) References Cited

FOREIGN PATENT DOCUMENTS

| | | | |
|---|---|---|---|
| JP | 2007322883 | A | 12/2007 |
| JP | 2012054584 | A | 3/2012 |
| JP | 2013524835 | A | 6/2013 |
| JP | 2016524781 | A | 8/2016 |
| JP | 2017005817 | A | 1/2017 |
| JP | 2017505038 | A | 2/2017 |
| JP | 2018110337 | A | 7/2018 |
| JP | 2018523987 | A | 8/2018 |
| KR | 20120046929 | A | 5/2012 |
| KR | 101159457 | B1 | 6/2012 |
| WO | 1996019026 | A1 | 6/1996 |
| WO | WO 2016/016619 | A1 | 2/2016 |
| WO | WO 2018/203044 | A1 | 11/2018 |
| WO | 2018163262 | A1 | 3/2019 |

OTHER PUBLICATIONS

Written Opinion for International Application No. PCT/EP 2020/051384 dated Jan. 26, 2021, 8 pages.

* cited by examiner

TOBACCO INDUSTRY PRODUCT AND METHODS RELATING TO TOBACCO INDUSTRY PRODUCTS

CROSS-REFERENCE TO RELATED APPLICATIONS

This application is a National Phase entry of PCT Application No. PCT/EP2020/051384, filed Jan. 21, 2020, which application claims the benefit of priority to GB 1900827.5 filed Jan. 21, 2019, the entire disclosures of which are incorporated herein by reference.

TECHNICAL FIELD

The present disclosure relates to an apparatus for heating aerosolisable material, a method for determining a condition of a component of a tobacco industry product, a method of manufacturing said apparatus and a tobacco industry product.

BACKGROUND

Articles such as cigarettes, cigars and the like burn tobacco during use to create tobacco smoke. Attempts have been made to provide alternatives to such articles which burn tobacco, by creating products that release compounds without burning. Examples of such products are so-called heat-not-burn products, also known as tobacco heating products or tobacco heating devices, which release compounds by heating, but not burning, the material. The material may be for example tobacco or other non-tobacco products or a combination, such as a blended mix, which may or may not contain nicotine.

Such products typically comprise a battery, which may be a rechargeable battery, and means for delivering electrical power to said battery. Such means include a charging port into which a connector can be inserted to deliver electrical power.

SUMMARY

According to a first aspect of the present disclosure, there is provided an apparatus for heating aerosolizable material to volatilize at least one component of said aerosolizable material, the apparatus comprising: a first connection interface for connecting to a power source for providing power for heating the aerosolizable material; a second connection interface for connecting to an external power source to supply power to the first connection interface to replenish the power source; and a temperature sensitive element positioned in thermal contact with the second connection interface so as to be responsive to changes in the temperature of the second connection interface, wherein: the supply of electrical power to the first connection interface from the second connection interface is inhibited based on the temperature sensitive element responding to an increase in the temperature of the second connection interface.

According to a second aspect of the present disclosure, there is provided a method of determining a condition of a connection interface of a tobacco industry product, the method comprising: monitoring a temperature sensitive element placed in thermal contact with a connection interface; determining a number of times the operation of the connection interface is inhibited due to an increase in temperature of the connection interface, based on the monitoring of the temperature sensitive element; and determining whether the connection interface is in a first condition or a second condition on the basis of the determined number of times the operation of the connection interface is inhibited, wherein the first condition indicates normal functioning of the connection interface and the second condition indicates a fault condition of the connection interface.

According to a third aspect of the present disclosure, there is provided a method of manufacturing an apparatus for heating aerosolizable material to volatilize at least one component of said aerosolizable material, the method comprising: providing a temperature sensitive element adjacent a connection interface of the apparatus such that the temperature sensitive element is in thermal contact with the connection interface; providing a controller configured to: monitor whether the temperature sensitive element is in a first state or a second state, the first state being a state of the temperature sensitive element responsive to a temperature below a temperature threshold and the second state being a state of the temperature sensitive element responsive to a temperature above the temperature threshold; and determine a fault condition of the connection interface based on a history of the state of the temperature sensitive element.

According to a fourth aspect of the present disclosure, there is provided a tobacco industry product comprising: a charging port for supplying power to the tobacco industry product; and a temperature detector positioned in thermal contact with the charging port such that heat is exchanged between the temperature detector and the charging port, wherein: operation of the charging port is inhibited responsive to the temperature detector detecting that the temperature of the charging port is above a temperature threshold.

BRIEF DESCRIPTION OF THE DRAWINGS

Embodiments of the disclosure will now be described, by way of example only, with reference to the accompanying drawings, in which.

DETAILED DESCRIPTION OF THE DRAWINGS

Figure 1:
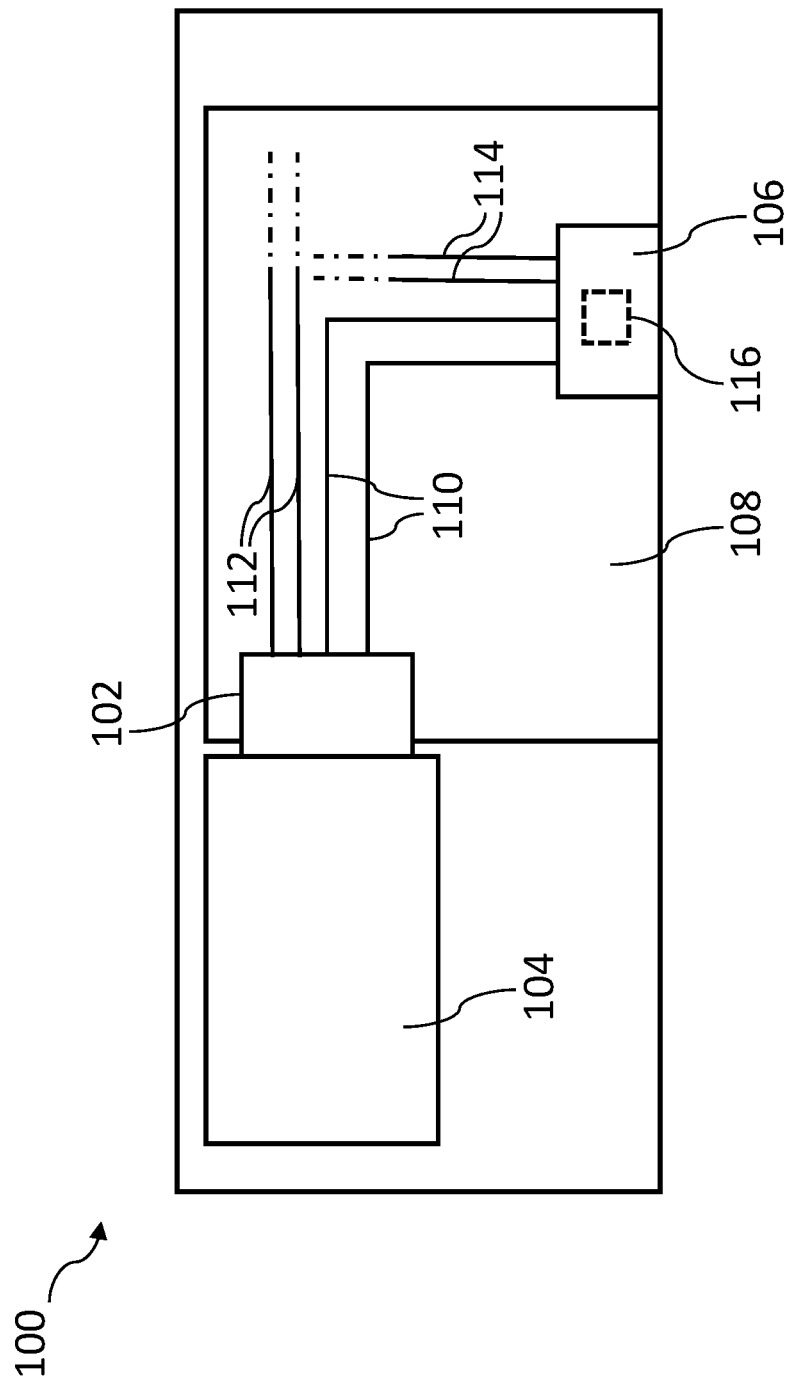
FIG. 1 is a schematic illustration an apparatus for heating aerosolizable material.

In order to address various issues and advance the art, the entirety of this disclosure shows by way of illustration and example various embodiments in which the claimed invention may be practiced and which provide for a superior system arranged to generate an inhalable medium. The advantages and features of the disclosure are of a representative sample of embodiments only, and are not exhaustive or exclusive. They are presented only to assist in understanding and teach the claimed and otherwise disclosed features. It is to be understood that advantages, embodiments, examples, functions, features, structures or other aspects of the disclosure are not to be considered limitations on the disclosure as defined by the claims or limitations on equivalents to the claims, and that other embodiments may be utilized and modifications may be made without departing from the scope or spirit of the disclosure. Various embodiments may suitably comprise, consist of, or consist in essence of, various combinations of the disclosed elements, components, features, parts, steps, means, etc. The disclosure may include other embodiments not presently claimed, but which may be claimed in future.

As used herein, the term "aerosolizable material" includes materials that provide volatilized components upon heating, typically in the form of an aerosol. "Aerosolizable material" includes any tobacco-containing material and may, for example, include one or more of tobacco, tobacco derivatives, expanded tobacco, reconstituted tobacco or tobacco substitutes. "Aerosolizable material" may also include other non-tobacco products which, depending on the product, may or may not contain nicotine. "Aerosolizable material" may, for example, be in the form of a solid, a liquid, a gel, a wax or the like. "Aerosolizable material" may also, for example, be a combination or a blend of materials. In some examples, the aerosolizable material is a gel. In some examples, the aerosolizable material is a liquid and may, for example, be provided in a suitable container for use with apparatus for heating aerosolizable material.

Apparatus is known that heats aerosalizable material to volatilize at least one component of the aerosalizable material, typically to form an aerosol which can be inhaled, without burning or combusting the aerosalizable material. Such apparatus is sometimes described as a "heat-not-burn" apparatus or a "tobacco heating product" or "tobacco heating device" or similar. Similarly, there are also so-called e-cigarette devices, which typically vaporize an aerosalizable material in the form of a liquid, which may or may not contain nicotine. The aerosalizable material may be in the form of or be provided as part of a rod, cartridge or cassette or the like which can be inserted into the apparatus. In some examples, a heater for heating and volatilizing the aerosalizable material may be provided as a "permanent" part of the apparatus or may be provided as part of an article comprising aerosalizable material or consumable which is discarded and replaced after use. An "article comprising aerosalizable material" or "consumable article" in this context is a device or article or other component that includes or contains in use the aerosalizable material, which is heated to volatilize the aerosalizable material to generate a flow of aerosol for inhalation by a user, and optionally other components in use.

FIG. 1 schematically illustrates an apparatus 100 for heating aerosolizable material to volatilize at least one component of said aerosolizable material. The apparatus 100 may be, for example, a portable hand held device which provides aerosol for inhalation by a user. The device 100 is an example of a tobacco industry product. The apparatus 100 (hereinafter "device" 100) comprises a first connection interface 102 for connecting to a power source for providing power for heating the aerosolizable material. For example, the first connection interface may connect to a battery 104, such as a lithium ion battery 104 or another type of disposable or rechargeable battery 104 suitable for a portable, handheld device. The battery 104 may be inserted into the device 100 such that it engages with the first connection interface 102 (hereinafter "battery interface" 102). The device 100 may, for example, be configured such that a user can insert or remove the battery 104. In other examples, the device 100 may be provided with a battery 104 already included and engaged with the battery interface 102, or which battery 104 is not removable by the user.

The battery interface 102 may comprise electrical components arranged in order to extract electrical power from or deliver electrical power to the battery 104. For example, the battery interface 102 may comprise electrical contacts that engage with one or more terminals of the battery 104 in order to connect electrically to the battery 104. It will be understood that various forms of battery interfaces may be used in a portable device such as device 100. The battery interface 102 may facilitate the delivery of power from the battery 104 to other components of the device 100 which require electrical power. For example, the battery interface 102 facilitates the delivery of electrical power from the battery 104 to a heating arrangement configured to heat aersolizable material to generate aerosol. Also, for example, the battery interface 102 facilitates the delivery of electrical power to the battery 104 in order to recharge, in other words replenish, the battery 104.

The device 100 comprises a second connection interface 106 for connecting to an external power source to supply power to the battery interface 102 to replenish the battery 104. The second connection interface 106 may be a port into which a connector can be inserted, or with which a connector may otherwise be engaged. The second connection interface 106 is a charging port for supplying power to the device 100. The second connection interface 106 may therefore be referred to as a charging port 106. The charging port 106 connects to an external power source via a connector inserted in (or otherwise engaged with) the charging port 106. For example, the charging port 106 may be a USB port for receiving a male USB connector. It will be understood that various different types of USB ports for receiving respective connectors may be used in a portable device such as device 100. For example, the charging port may be a USB Type A port, USB Type Mini B port, USB Type Micro B port, USB Type C port, etc. In other examples, the charging port 106 may be a type of port other than a USB port, which is suitable for being provided on a handheld portable device for connecting to an external power source.

The external power source may, for example, be mains electricity (e.g. where the charging port connects to the mains electricity supply via a connector and wall plug, etc.), an electronic device capable of supplying power such as a laptop, a portable battery pack and the like.

In the example of FIG. 1, the device 100 comprises a printed circuit board (PCB) 108. In this example, the battery interface 102 and the charging port 106 are mounted onto the PCB 108. Although in this example, both the battery interface 102 and the charging port 106 are mounted onto the same PCB 108, in some examples, the battery interface 102 and the charging port 106 may be mounted onto separated PCBs. In this example, the PCB 108 facilitates electrical connections between the battery interface 102 and the charging port 106 as illustrated by power delivery tracks 110. The PCB also facilitates electrical connections between the battery interface 102 and various other components (not shown) of the device 100, and between the charging port 106 and various other components of the device 100. In this example, the battery interface 102 is electrically connected to other components of the device 100 via battery interface tracks 112 on PCB 108, and the charging port 106 is electrically connected to other components of the device 100 via charging port tracks n on PCB 108.

In some examples, the charging port 106 is also configured for data communication. The device 100 may comprise a controller (not shown) for controlling various operations of the device 100. The device 100 may also comprise a data storage component (not shown) in data communication with the controller. For example, the charging port 106 may allow communication of data between the data storage component of the device 100, the controller of the device 100, etc. and an external device (such an external computing/smart device, e.g. smartphone, laptop and the like). For example, data may be communicated between a data storage component of the device 100 and the charging port 106 via the charging port tracks 114, and data may be communicated between the charging port 106 and an external device via a connector inserted into (or otherwise engaged with) the charging port 106.

The device 100 comprises a temperature sensitive element 116 positioned in thermal contact with the charging port 106 so as to be responsive to changes in the temperature of the charging port 106. The temperature sensitive element 116 is, in other words, a temperature detector positioned in thermal contact with the charging port 106 such that heat is exchanged between the temperature detector and the charging port 106. For example, the temperature sensitive element 116 may be responsive to changes in the temperature of the charging port 106 in that a characteristic of the temperature sensitive element 116 changes as a function of the temperature of the charging port 106. The temperature sensitive element 116 may be any type of temperature sensor suitable for use in a portable hand held device, for example, a sensor comprising a bi-metallic strip, a thermistor, a resistive temperature detector, a thermocouple, a resettable fuse and the like.

In device 100, the supply of electrical power to the battery interface 102 from the charging port 106 is inhibited based on the temperature sensitive element 116 responding to an increase in the temperature of the charging port 106. In other words, the operation of the charging port 106 is inhibited due to the temperature sensitive element 116 responding to an increase in the temperature of the charging port 106. For example, the supply of power to the battery interface 102 from the charging port 106 may be inhibited based on the temperature sensitive element 116 responding to the temperature of the charging port 106 being above a temperature threshold (i.e. operation of the charging port is inhibited responsive to the temperature detector detecting that the temperature of the charging port 106 is above a temperature threshold). The term "inhibited" is used herein to refer to the supply of electrical power (or the flow of current, and the like) being caused to be reduced/diminished, [[and/or]] or prevented.

The temperature threshold may be set to a higher temperature than a normal operating temperature of the charging port 106. The normal operating temperature may be a temperature within a given range of temperatures the charging port 106 is expected to reach during supply of power to the battery interface 102 when there is no fault with the charging port 106. For example, the upper limit of this given range may be defined by a maximum operating temperature the charging port 106 is expected to reach when there is no fault with the charging port 106 and the charging port 106 receives a maximum current which the device 100 is configured to receive at the charging port 106. In some examples, the temperature threshold may be set higher than the maximum operating temperature. In other words, the temperature threshold may be defined such that the supply of power from the charging port 106 to the battery interface 102 is not inhibited at or below temperatures the charging port 106 may reach at maximum current levels when it is functioning normally (causes of the charging port 106 not function normally are described below).

The following description is m the context of an example in which the temperature sensitive element 116 is a resettable fuse 116 (a resettable fuse may also be referred to as a polyfuse or a polyswitch).

The resettable fuse 116 may be positioned in thermal contact with the charging port 106 by, for example, being positioned in close physical proximity to the charging port 106 on PCB 108. For instance, the resettable fuse 116 may be provided adjacent the charging port 106 of the device 100 such that the resettable fuse 116 is in thermal contact with the charging port 106. In some examples, thermal contact between the resettable fuse 116 and the charging port 106 may be provided by a thermally conducting component which is in physical contact with the resettable fuse 116 and the charging port 106.

Figure 2:
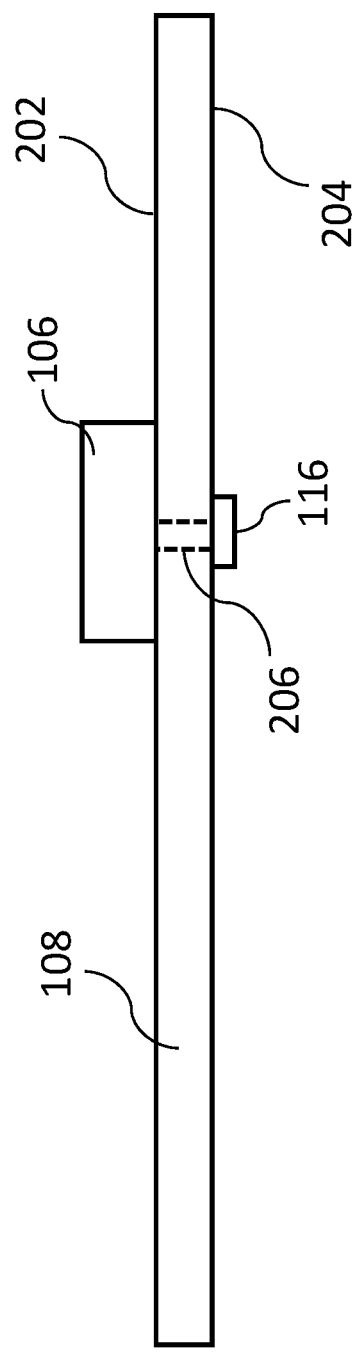
FIG. 2 is a schematic side view of components of the apparatus of FIG. 1.

FIG. 2 illustrates a side view of the PCB 108 shown in FIG. 1 with the charging port 106 and the resettable fuse 116 mounted thereon (note that some components shown in FIG. 1 are omitted from FIG. 2 to maintain clarity). In this example, the charging port 106 is provided on a first side 202 of the PCB 108, and the resettable fuse 116 is provided on a second side 204 of the PCB 108. In such examples, the internal structure of at least a part of the PCB 108 may be arranged to facilitate heat transfer between the charging port 106 and the resettable fuse 116. In the example of FIG. 2, the resettable fuse 116 is provided on the second side 204 directly opposite the charging port 106 on the first side 202. In the example of FIG. 2, the part of the PCB 108 in between the charging port 106 and the resettable fuse 116 is arranged to facilitate heat transfer. In this example, the part of the PCB 108 between the charging port 106 and the resettable fuse 116 is provided with a thermal via 206 which provides thermal contact between the charging port 106 and the resettable fuse 116.

The thermal via 206 may be a hollow cylinder composed of a metal with good thermal conduction properties. For example, the thermal via 206 may be a hollow cylinder composed of copper and the like.

The resettable fuse 116 may transition from a first state to a second state responsive to an increase in temperature of the charging port 106 above the temperature threshold. As described, the resettable fuse 116 is in thermal contact with the charging port 106. Therefore, when the temperature of the charging port 106 increases, the temperature of the resettable fuse 116 may also increase. The resettable fuse 116 transitions from the first state to the second state when the resettable fuse reaches a switching temperature. The first state may be a conductive state in which the electrical resistance of the resettable fuse 116 is below a given electrical resistance amount. The second state may be a non-conductive state in which the electrical resistance of the resettable fuse 116 is above the given electrical resistance amount. When the resettable fuse 116 is in the non-conductive state, the flow of current there through is inhibited. The values of the electrical resistance of the resettable fuse 116 in the conductive and non-conductive states (and therefore the given electrical resistance amount) may depend on certain properties of the resettable fuse 116 such as, for example, the relative quantity of conductive particles included in the polymer matrix of the resettable fuse 116.

As described, the temperature threshold may be greater than the maximum operating temperature. The resettable fuse 116 is selected so that it reaches its switching temperature when the charging port 106 is at the temperature threshold. The thermal contact between the charging port 106 and the resettable fuse 116 may be sufficient such that the resettable fuse 116 and the charging port 106 can be estimated to be at the same temperature. In such instances (e.g. where there is very good thermal contact between the resettable fuse 116 and the charging port 101), the resettable fuse 116 may be selected such that its switching temperature is the same as the temperature threshold. In examples where the temperature of the resettable fuse 116 cannot be estimated to be the same as the temperature of the charging port 106, the resettable fuse 116 may be selected such that its switching temperature is a temperature the resettable fuse 116 is expected to reach when the charging port 106 is at the temperature threshold.

When the resettable fuse 116 is in the non-conductive state, it can cool such that it transitions from the non-conductive state to the conductive state, i.e. it can cool such that the polymer matrix transitions from being amorphous to crystalline. In this example, the resettable fuse 116 transitions from the non-conductive state to the conductive state responsive to the temperature of the charging port 106 dropping below the temperature threshold. When the resettable fuse 116 transitions from the non-conductive state to the conductive state, the supply of electrical power to the battery interface 102 from the charging port 106 is no longer inhibited.

Therefore, in this example, the resettable fuse 116 changes its state depending upon whether the temperature of the charging port 106 is above or below the temperature threshold. As described, the supply of electrical power between the battery interface 102 and the charging port 106 is inhibited based on the resettable fuse 116 responding to the temperature of the charging port 106 being above the temperature threshold.

In operation, the resettable fuse 116 may therefore inhibit the supply of power when the temperature of the charging port 106 is above the temperature threshold, but may cease to inhibit the supply of power once the temperature of the charging port 106 drops below the temperature threshold.

One manner in which supply of electrical power may be inhibited is as follows. The resettable fuse may be electrically connected in series between the battery interface 102 and the charging port 106. The series connection would mean that current passes through the resettable fuse 116 when transfer of electrical power from the charging port 106 to the battery interface 102 takes place. In this case, when the resettable fuse 116 transitions from the conductive state to the non-conductive state responsive to the temperature of the charging port 106 being above the temperature threshold, the resettable fuse 116 inhibits the flow of current through the resettable fuse 116 (due to its resistance being above the given electrical resistance amount in the non-conductive state) meaning that the transfer of electrical power from the charging port 106 to the battery interface 102 is inhibited.

It should be appreciated that current flowing through the resettable fuse 116 can also cause the temperature of the resettable fuse 116 to rise. If the resettable fuse 116 is arranged in the device 100 such that a current flows through it, then the temperature of the resettable fuse 116 will rise due to the current flowing through it as well as due to transfer of heat from the charging port 106. Therefore, it is possible that the resettable fuse 116 transitions from the conductive state to the non-conductive state depending upon not only the transfer of heat from the charging port 106, but also how much current flows through the resettable fuse 116.

Figure 3:
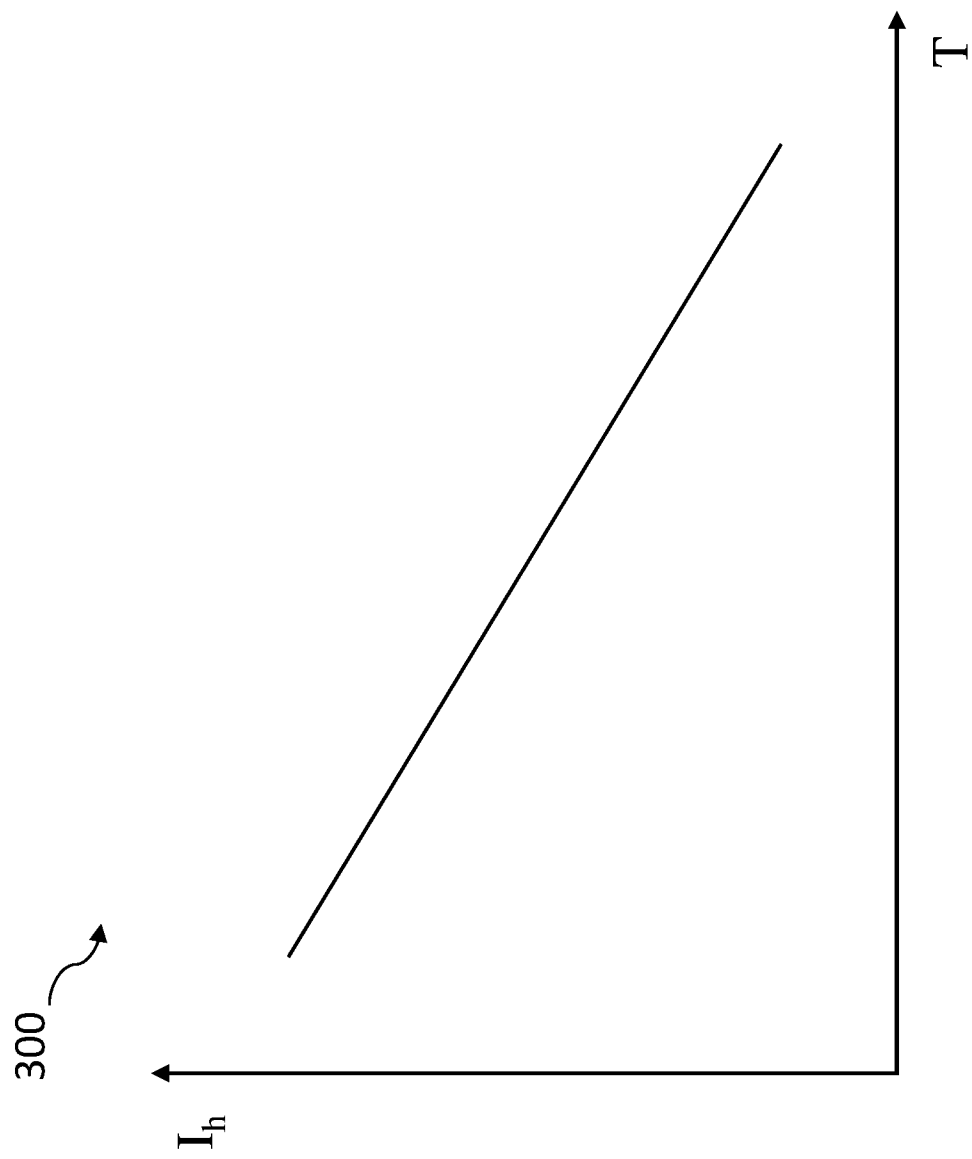
FIG. 3 is a sketch of a graph illustrating temperature dependent behavior of a component of the apparatus of FIG. 1.

A holding current of the resettable fuse 116 may be defined as the maximum current flow the resettable fuse 116 can support before the resettable fuse 116 reaches the switching temperature, i.e. transitions from the conductive state to the non-conductive state. It should be appreciated that the resettable fuse 116 may transition from the conductive state to the non-conductive state if it reaches the switching temperature, no matter the cause of the rise in temperature. The holding current may vary with the temperature of the resettable fuse 116. This is because, the hotter the resettable fuse 116 is, the less the current flow required to further increase the temperature of the resettable fuse 116 until it reaches the switching temperature. FIG. 3 shows a graph 300 illustrating an example relationship between the holding current of the resettable fuse 116 and the temperature of the resettable fuse 116. In the graph 300, the vertical axis represents the holding current $1_h$ of the resettable fuse 116 and the horizontal axis represents the temperature T of the resettable fuse 116. Graph 300 illustrates a linear decrease in the holding current $1_h$ as the temperature T of the resettable fuse 116 increases.

In the context of the described examples, the higher the temperature of the charging port 106, the higher the temperature of the resettable fuse 116 and therefore the lower the holding current of the resettable fuse 116. The charging port 106 may receive a current flow within a range between a minimum current and the maximum current for transfer of electrical power to the battery interface 102 to take place. The resettable fuse 116 may be selected such that its holding current, when the temperature of the charging port 106 is at the temperature threshold, is less than the minimum current. This means that, when the temperature of charging port 106 is at or higher than the temperature threshold, any amount of current for the supply of electrical power (within the described range) will result in the resettable fuse reaching the switching temperature and the supply of power will therefore be inhibited.

In the above example (i.e. where the resettable fuse 116 is electrically connected in series as described), the arrangement of the resettable fuse 116 with respect to the charging port 106 and the battery interface 102 is such that transfer of electrical power is inhibited directly by the resettable fuse 116.

In this example, when the temperature of the charging port 106 drops below the temperature threshold and in consequence the temperature of the resettable fuse 116 falls below the switching temperature, the resettable fuse 116 transitions from the non-conductive state to the conductive state so that current flow through it is no longer inhibited, and thus, current flow between the charging port 106 and the battery interface 102 is no longer inhibited. Therefore, in examples where the resettable fuse 116 is electrically connected in series between the charging port 106 and the battery interface 102, the supply of power to the battery interface 102 from the charging port 106 ceases to be inhibited directly by the resettable fuse 116 when the temperature of the charging port 106 drops below the temperature threshold.

In other examples, the resettable fuse 116 may not be arranged in a manner (as described) so as to directly inhibit the transfer of electrical power under the desired conditions. For example, the resettable fuse 116 may not be electrically connected in series as described. As described, the resettable fuse 116 is an example of a temperature sensitive element. In some examples, a different temperature sensitive element may be used which does not inhibit the supply of power directly in the manner described.

In examples where the temperature sensitive element does not directly inhibit the supply of electrical power, the supply of electrical power may be inhibited by other components of the device 100. For example, the controller may receive, via charging port tracks 114, indications based on the resettable fuse 116 responding to the variation in temperature of the charging port 106. For example, the controller may receive a first indication that the temperature of the charging port 106 is above the temperature threshold. The first indication may be received as a result of the resettable fuse 116 transitioning from the conductive state to the non-conductive state. Obtaining the first indication may involve a measurement of the resistance across the resettable fuse 116, for example, which indicates that the resistance of the resettable fuse 116 has gone from being below the given electrical resistance amount to being above it.

In the response to the first indication, the controller may cause the supply of electrical power to the battery interface 102 from the charging port 106 to be inhibited. The controller may cause the inhibition, for example, by interrupting the electrical connection between the charging port 106 and the battery interface 102, or the like, by means of opening a switch, etc.

The controller may receive a second indication that the temperature of the charging port 106 is below the temperature threshold. The second indication may be received when the resettable fuse transitions from the non-conductive state to the first due to the charging port 106 cooling to below the temperature threshold. Similarly to the first indication, the second indication may be received as a result of the resettable fuse transitioning from the non-conductive state to the conductive state and obtaining the second indication may involve a measurement of the resistance across the resettable fuse 116 indicating that the resistance of the resettable fuse 116 has gone from being above the given electrical resistance amount to being below it. In response to the second indication, the controller may allow the supply of power to the battery interface 102 from the charging port 106, e.g. by closing a switch electrically connecting the two.

The temperature of the charging port 106 may increase due to current flowing through the charging port 106. The temperature of the charging port 106 may exceed the temperature threshold during transfer of electrical power from the charging port 106 to the battery interface 102 if a fault exists in the charging port 106. Examples of faults in the charging port 106 include mechanical faults with the charging port 106 such as, for example, physical damage to the charging port 106 which causes the temperature of the charging port 106 to exceed the temperature threshold during transfer of electrical power. Examples of faults also include the charging port 106 becoming contaminated, for example, with debris. Debris may enter the charging port 106 and cause its temperature to exceed the temperature threshold during transfer of electrical power, for example, by affecting the electrical contact surface area of the charging port 106 which can freely receive a current being supplied. In some cases, a liquid may enter the charging port 106 and may solidify to form debris in consequence to heat generated at the charging port 106 during transfer of electrical power.

When the temperature of the charging port 106 exceeds the temperature threshold, the supply of electrical power to the battery interface 102 from the charging port 106 is inhibited, as described. When the supply of power is inhibited by means of the current flow through the charging port 106 being inhibited, the charging port 106 cools as a result. Once the charging port 106 has cooled sufficiently (such that a transition from the non-conductive state to the conductive state occurs), the supply of power would no longer be inhibited, as described. It may be the case that the fault in the charging port 106 which caused, in the first place, the temperature of the charging port 106 to exceed the temperature threshold has cleared (i.e. is no longer present) when the charging port 106 cools and the supply of electrical power is no longer inhibited. It will be understood that this may not be the case for certain mechanical faults, but other faults, such as debris, may have cleared. In this case, electrical power may continue to be supplied to the battery interface 102.

In some examples, the fault in the charging port 106 may persist such that the temperature of the charging port 106 repeatedly exceeds the temperature threshold. The charging port 106 may be in a first condition, in which the charging port is functioning normally, or a second condition, in which there is a persistent fault in the charging port 106 causing its temperature to repeatedly exceed the temperature threshold. Normal functioning in this context means that the temperature of the charging port 106 does not repeatedly exceed the temperature threshold in a short amount of time. The first condition may be referred to as the normal functioning condition. The second condition may be referred to as the fault condition.

Figure 4:
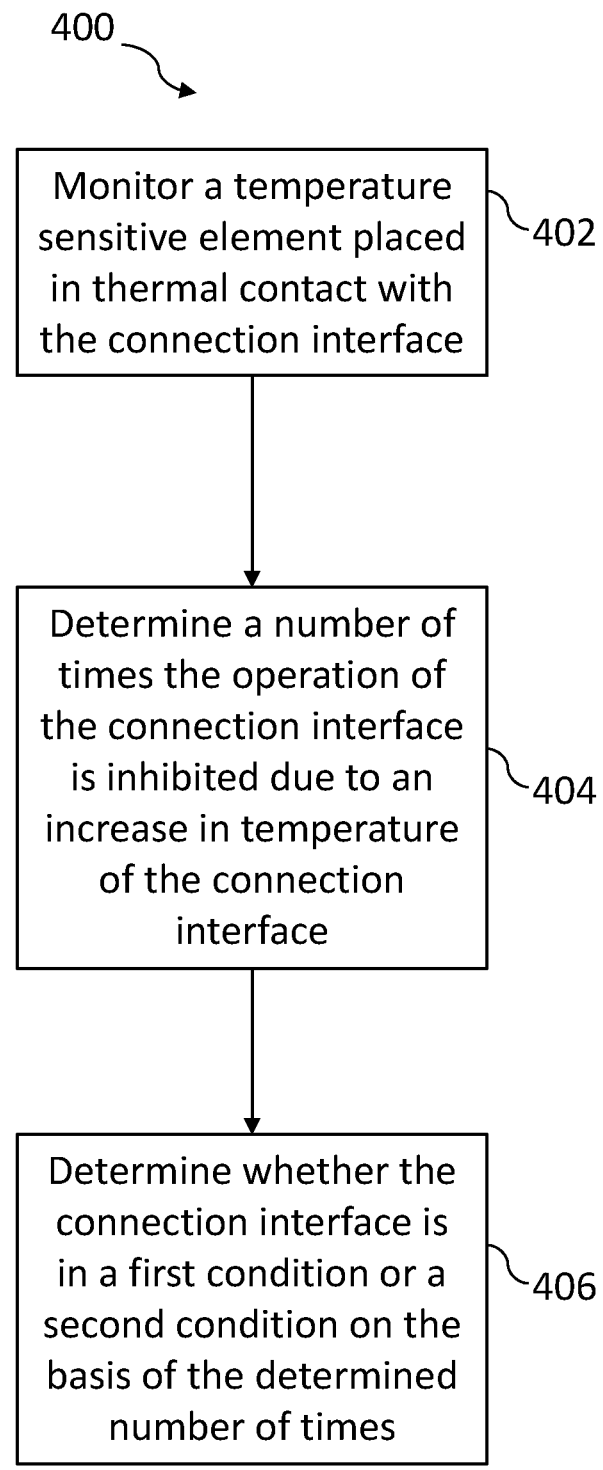
FIG. 4 is a block diagram illustrating a method for determining a condition of a component of the apparatus of FIG. 1.

The controller may be configured to monitor the resettable fuse 116, and determine whether the charging port is in a fault condition based on a history of the resettable fuse 116. The controller of the device 100 may employ a method such as method 400 illustrated in the block diagram of FIG. 4.

At block 402 of the method 400, a temperature sensitive element placed in thermal contact with the connection interface is monitored. For example, the resettable fuse 116 in thermal contact with the charging port 106 (e.g. by means of thermal via 206) is monitored. The controller performs the monitoring of block 402 via the charging port tracks 114, for example. At block 404 of the method 400, a number of times the operation of the connection interface is inhibited due to an increase in temperature of the connection interface is determined, based on the monitoring of the temperature sensitive element. In the context of block 404, the operation of the connection interface is inhibited due to the temperature sensitive element responding to the increase in the temperature of the connection interface. For example, the resettable fuse 116 responds to the increase in the temperature of the charging port 106 by transitioning from the conductive state to the non-conductive state. The operation of the charging port 106 is inhibited due to the inhibition of the supply of electrical power to the battery interface 102 from the charging port 106 responsive to the increase in the temperature of the charging port 106. For example, the controller makes the determination as per block 404.

At block 406, whether the connection interface is in a first condition or a second condition is determined on the basis of the determined number of times the operation of the connection interface is inhibited, the first condition indicating normal functioning of the connection interface and the second condition indicating a fault condition of the connection interface. For example, based on the determined number of times the supply of electrical power to the battery interface 102 from the charging port 106 is inhibited, the controller determines whether the charging port 106 is in the first condition (normal functioning condition) or the second condition (fault condition—where the charging port 106 has a persistent fault).

Block 406 may comprise determining whether the charging port 106 is in the normal functioning condition or the fault condition based on a frequency of the operation of the charging port 106 being inhibited in a given interval of time. For example, the given interval of time may be the amount of time required for the battery 104 of the device 100 to advance from a first charge state to a second charge state, or a multiple of that amount of time. The first charge state may be selected to be a charge state at which users of the device 100 are typically expected to initiate charging (e.g. by plugging a suitable connector into the charging port 106 for power delivery). For example, the first charge state may be 20% battery remaining. The second charge state may be 100% battery remaining, or another value at which the user is expected to typically terminate charging (e.g. 80%, etc.). It should be appreciated that the precise charge states are not material to the way in which the method 400 is performed.

For instance, the charging port 106 may be determined to be in a fault condition if its operation is inhibited as described three or more times in the given interval of time, the given interval of time being the amount of time required for the battery to advance from 20% battery remaining to 80% battery remaining. Such a history of the charging port 106 may be due to a fault which is persisting.

In some examples, the device 100 comprises an indicator for indicating a fault condition of the charging port 106 to a user of the device 100 or configured to transmit information regarding the condition of the charging port 106 for receipt by a server.

For example, the device 100 may comprise a visual indicator, an audio indicator, a haptic indicator and the like. For example, a visual indicator may comprise a light such as an LED, or a more complex indicator such as a display screen for displaying information (as text, graphics, etc.).

The device 100 may transmit the information regarding the condition when the device 100 is connected to a smart device, such as a laptop, etc. For instance, the controller may transmit, via the charging port tracks 114, the information when the smart device is connected to the device 100 by means of the charging port 106. The smart device may then transmit the information to the server. Alternatively, or in addition, the device 100 may comprise a wireless transmitter for transmitting the information. The device 100 may wirelessly transmit the information via a network (e.g. a mobile communications network) for receipt by the server, or may wirelessly transmit the information to the smart device (e.g. via Bluetooth, WiFi, etc.) for eventual receipt by the server. The smart device may transmit the information to the server.

The server may collect information regarding the condition of the charging port 106. The manufacturer of the device 100 may access this information and may offer the user a replacement or repair with respect to the device 100. Advantageously, the manufacturer may also gain information regarding the performance and reliability of the charging port 106 in the device 100. The information collected by the server may also aid in diagnosing problems with the device 100, for example, it may be possible to determine whether or not problems reported by the user are due to a persistent fault with the charging port 106.

A method of manufacturing an apparatus for heating aerosolizable material, such as the device 100 according to some of the described examples, may be performed. Such a method comprises providing a temperature sensitive element (e.g. the resettable fuse 116) adjacent a connection interface (e.g. the charging port 106) of the apparatus such that the temperature sensitive element is in thermal contact with the connection interface. Such a method also comprises providing a controller, such as the described controller, which is configured to monitor whether the temperature sensitive element is in a first state or a second state, the first state being a state of the temperature sensitive element responsive to a temperature below a temperature threshold and the second state being a state of the temperature sensitive element responsive to a temperature above the temperature threshold. The provided controller, in such a method, is also configured to determine a fault condition of the connection interface based on a history of the state of the temperature sensitive element.

The various examples described herein are presented only to assist m understanding and teaching the claimed features. These examples are provided as a representative sample only, and are not exhaustive or exclusive. It is to be understood that advantages, embodiments, examples, functions, features, structures, or other aspects described herein are not to be considered limitations on the scope of the disclosure as defined by the claims or limitations on equivalents to the claims, and that other embodiments may be utilized and modifications may be made without departing from the scope of the claimed invention. Various embodiments of the disclosure may suitably comprise, consist of, or consist essentially of, appropriate combinations of the disclosed elements, components, features, parts, steps, means, etc., other than those specifically described herein. In addition, this disclosure may include other embodiments not presently claimed, but which may be claimed in future.

The invention claimed is:

1. An apparatus for heating aerosolizable material to volatilize at least one component of the aerosolizable material, the apparatus comprising:
a first connection interface configured to connect a power source for providing power for heating the aerosolizable material;
a second connection interface configured to connect an external power source to supply power to the first connection interface to replenish the power source;
a temperature sensitive element positioned in thermal contact with the second connection interface so as to be responsive to changes in the temperature of the second connection interface, wherein the thermal contact is provided by a thermally conducting component which is in physical contact with the temperature sensitive element and the second connection interface; and
wherein:
the supply of electrical power to the first connection interface from the second connection interface is inhibited based on the temperature sensitive element responding to an increase in the temperature of the second connection interface.

2. The apparatus according to claim 1 wherein the supply of power to the first connection interface from the second connection interface is inhibited based on the temperature sensitive element responding to the temperature of the second connection interface being above a temperature threshold, and temperature threshold is set to a higher temperature value than a normal operating temperature of the second connection interface.

3. The apparatus according to claim 1, further comprising a printed circuit board, wherein the second connection interface is provided on a first side of the printed circuit board, and the temperature sensitive element is provided on a second side of the printed circuit board.

4. The apparatus according to claim 3, wherein the internal structure of at least a part of the printed circuit board is arranged to facilitate heat transfer between the second connection interface and the temperature sensitive element.

5. The apparatus according to claim 4, further comprising a thermal via which provides thermal contact between the second connection interface and the temperature sensitive element.

6. The apparatus according to claim 1, wherein:
the temperature sensitive element is a resettable fuse; and
the resettable fuse transitions from a first state to a second state responsive to an increase in temperature of the second connection interface above the temperature threshold, the first state being a state in which the electrical resistance of the resettable fuse is below a given electrical resistance amount and the second state being a state in which the electrical resistance of the resettable fuse is above the given electrical resistance amount.

7. The apparatus according to claim 6, wherein the resettable fuse transitions from the second state to the first state responsive to the temperature of the connection interface dropping below the temperature threshold.

8. The apparatus according to claim 1, wherein the temperature sensitive element is electrically connected in series between the first connection interface and the second connection interface.

9. The apparatus according to claim 1, further comprising a controller configured to monitor the temperature sensitive element, and determine whether the second connection interface is in a fault condition based on a history of the temperature sensitive element.

10. The apparatus according to claim 9, further comprising an indicator for indicating a fault condition of the second connection interface to a user of the apparatus or configured to transmit information regarding the condition of the second connection interface for receipt by a server.

* * * * *